United States Patent [19]

Muller et al.

[11] 4,011,773

[45] Mar. 15, 1977

[54] STEERING WHEEL

[75] Inventors: George H. Muller, Ann Arbor; Warren A. VanWicklin, Jr., Dearborn, both of Mich.

[73] Assignee: Ford Motor Company, Dearborn, Mich.

[22] Filed: Dec. 19, 1975

[21] Appl. No.: 642,643

[52] U.S. Cl. .................................................. 74/552
[51] Int. Cl.² ..................... B62D 1/04; G05G 1/10
[58] Field of Search ........................... 74/552, 491

[56] References Cited

UNITED STATES PATENTS

| | | | |
|---|---|---|---|
| 2,596,784 | 5/1952 | Nagin | 74/552 |
| 2,810,301 | 10/1957 | Mathues | 74/552 |
| 2,814,211 | 11/1957 | Hoagg | 74/552 |
| 2,889,714 | 6/1959 | Romano | 74/493 |
| 3,321,996 | 5/1967 | Cardinale | 74/552 |
| 3,456,526 | 7/1969 | Brilmyer | 74/552 |

*Primary Examiner*—Leonard H. Gerin
*Attorney, Agent, or Firm*—Clifford L. Sadler; Keith L. Zerschling

[57] ABSTRACT

A steering wheel made according to the present disclosure has a composite rim core construction that is secured to a pair of radially extending steering wheel spokes. The lower half of the steering wheel rim is relatively rigid and the upper half of the steering wheel rim has a leaf spring core which bends upon impact whereby a portion of the load of the impact is absorbed.

15 Claims, 6 Drawing Figures

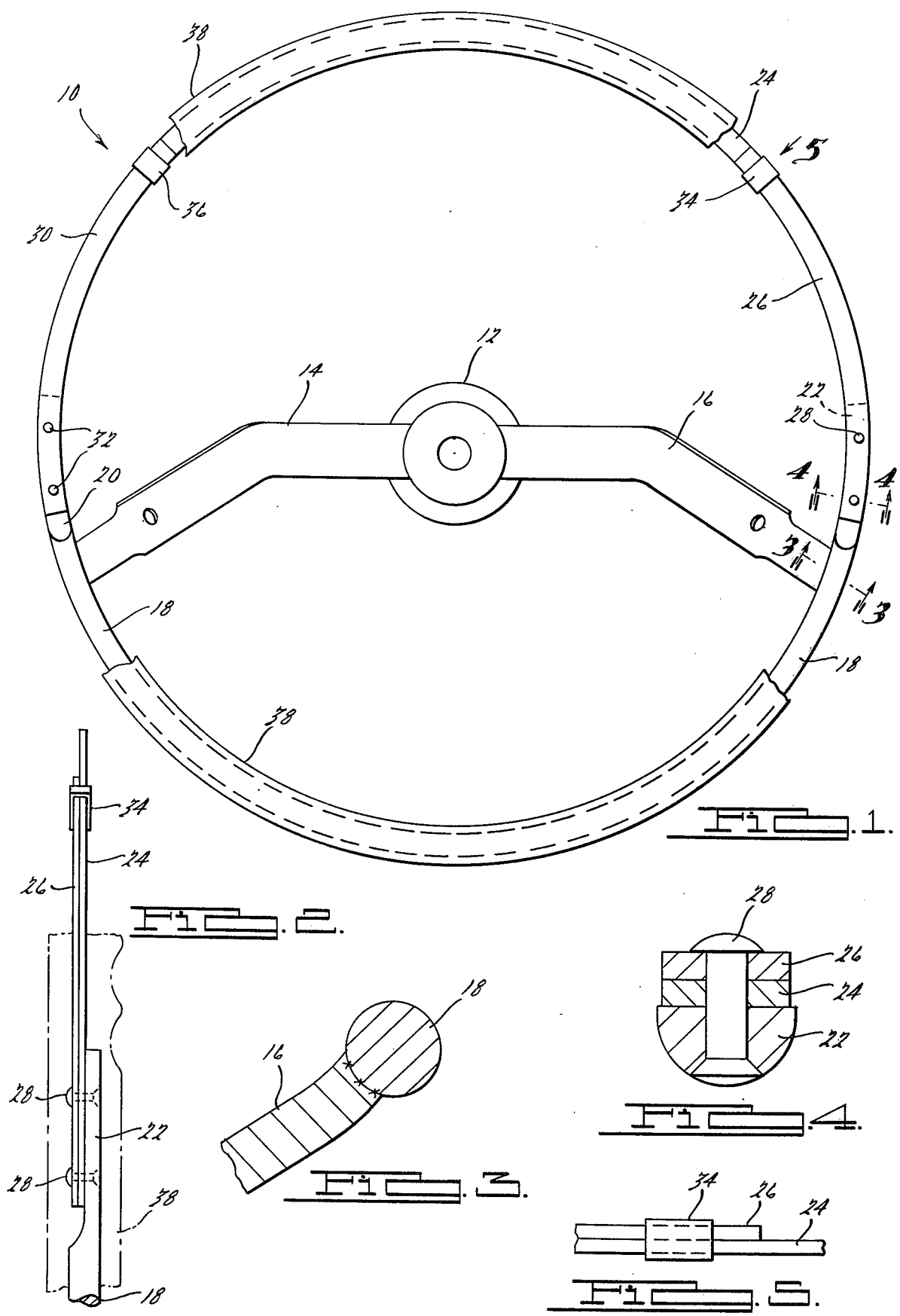

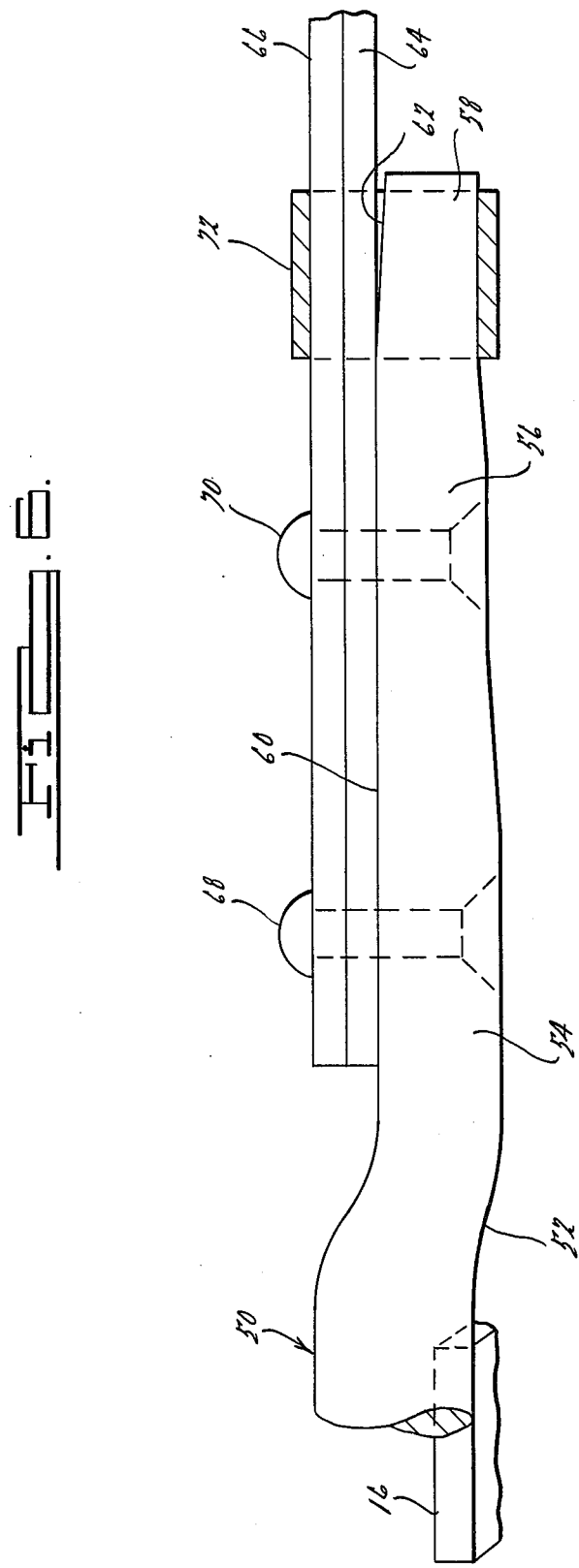

STEERING WHEEL

BACKGROUND OF THE DISCLOSURE

The present disclosure relates to steering wheels for a motor vehicle, and more particularly to steering wheels which have a rim that resiliently deflects under an impact load so as to absorb a portion of the load. The invention of this patent is an improvement upon prior art steering wheels such as shown in U.S. Pat. Nos. 3,321,996 and 3,456,526.

BRIEF SUMMARY OF THE DISCLOSURE

In the preferred embodiment of the present invention, a steering wheel has a hub from which a pair of spokes radiate. A rim core assembly of composite construction is secured to the spokes. The ends of the spokes are welded to an arcuate lower rim core portion of relatively rigid construction. An upper arcuate rim core portion is formed of flat leaf spring steel and is riveted to the ends of the lower rim core. The steering wheel spokes and the upper and lower rim core portions are encased in a plastic material.

The steering wheel is intended for use in a motor vehicle. In the event an impact load parallel to the axis of the steering wheel is imposed upon the upper portion of the steering wheel rim, the rim will deflect due to the resiliency of the leaf spring core whereby a portion of the energy of the impact load will be absorbed.

BRIEF DESCRIPTION OF THE DRAWINGS

The many objects and advantages of a steering wheel constructed in accordance with this invention will become apparent upon consideration of the following detailed discussion and the accompanying drawings, in which:

FIG. 1 is a plan view of a steering wheel constructed in accordance with a preferred embodiment of the invention;

FIG. 2 is a side elevational view of a portion of the rim structure of the steering wheel of FIG. 1;

FIG. 3 is a sectional view taken along section line 3—3 of FIG. 1 showing the connection between the end of one of the spokes and the rim core;

FIG. 4 is a sectional view taken along section line 4—4 of FIG. 1;

FIG. 5 is an elevational view of a portion of the rim core construction taken in the direction of arrow 5 of FIG. 1; and FIG. 6 is a side elevational view of a portion of a rim core according to an alternate embodiment of the invention.

DETAILED DESCRIPTION OF A PREFERRED EMBODIMENT

Referring now to the drawings wherein the presently preferred embodiments of this invention are illustrated, FIG. 1 discloses a steering wheel 10 having a unique composite rim construction. The steering wheel 10 has a hub 12 for attachment to a steering shaft. Left and right spokes 14 and 16 extend upwardly from the hub 12. It will be seen in FIG. 1 the spokes 14 and 16 are of dogleg construction having downwardly turned ends.

The rim for the steering wheel 10 includes a lower rim core portion 18 formed from a rigid round bar. As seen in FIG. 1, the lower rim core 18 has a semi-circular shape in the plan view. The outer ends of the spokes 14 and 16 are welded to the core 18 near its ends as seen in FIG. 3. The left and right ends 20 and 22 of the core 18 extend beyond the point where the left and right spokes 14 and 16 are connected to it. The core ends 20 and 22 have a semi-circular cross section with a flat upper surface as seen in FIGS. 2 and 4.

The core 24 for the upper half of the rim of the steering wheel 10 comprises a flat leaf spring 24 that is formed into approximately one half of a circle. The ends of the semi-circular leaf spring 24 are positioned on the flat surfaces of the ends 20 and 22 of the lower rim core 18. A right, relatively short, arcuate leaf spring member 26 is positioned on top of the right end of the leaf spring 24 and a pair of rivets 28 extend through the arcuate spring 26, the leaf spring 24 and the end 22 of the rim core 18 whereby these members are rigidly secured together.

Similarly, a short arcuate leaf spring 30 overlays the left end of the leaf spring 22. A pair of rivets 32 secure the left end of the semi-circular spring 24 and the arcuate spring 30 to the flat surface of the left end 20 of the rim core 18.

A metal band 34 encircles the arcuate leaf spring 26 and the semi-circular leaf spring 24 adjacent the end of the spring 26. Similarly, a band 36 secures the upper end of the arcuate spring piece 30 to the semi-circular spring 24.

In one embodiment of the invention the main arcuate leaf spring 24 had an arcuate length equal to 203° and the rod 18 had an arcuate extent equal to 190°. This arrangement provides a 16½° overlap at the left and right junctures of the spring 24 and the rod 18.

The core of the rim which comprises the lower core member 18 and the leaf springs 24, 26 and 30 is encased in a plastic covering 38 which gives a decorative appearance to the steering wheel 10 and provides a comfortable surface to be gripped by a vehicle operator. In addition, a decorative covering (not shown) may be provided for the spokes 14 and 16.

It will be noted from FIG. 4 that the semi-circular leaf spring member 24 has a rectangular shape in cross section as does the short arcuate spring members 26 and 30. These members have flat upper surfaces that are parallel to a plane perpendicular to the axis of rotation of the steering wheel. In the event an impact load is imposed upon the upper half of the steering wheel in a direction parallel to the axis of rotation of the wheel, the leaf spring core for the wheel rim will permit the rim to deflect and to absorb a portion of the impact load. A similar load upon the lower rim core 18 will not produce such a deflection.

The arcuate leaf spring members 26 and 28 serve to resist localized stressing of the semi-circular spring member 24 when it is subjected to an impact load. The arcuate spring members 26 and 30 also facilitate the attachment of the main energy absorbing spring 24 to the rigid core 18 for the lower half of the wheel 10.

During the normal operation of the steering wheel 10, the orientation of the springs 24, 26 and 30 will provide a construction that will resist deflection of the upper portion of the rim with respect to a generally tangential force such as exerted by a vehicle operator when turning the wheel 10.

ALTERNATE EMBODIMENT

FIG. 6 discloses an alternate construction of the steering wheel rim core. In this embodiment, rod stock is bent into a semi-circular shape to form a rim core member 50 similar to the member 18 of FIG. 1. It is welded to the ends of the spokes 14 and 16 the same as member 18.

The rim core member 50 differs from member 18 in the configuration of its end portions that extend beyond the spokes 14 and 16. In FIG. 6, the left end portion of member 50 has a progressively smaller cross sectional area. It comprises a bent portion 52, an adjacent portion 54, an intermediate portion 56 and an end 58. Portion 54 is bigger in thickness and cross sectional area than portion 56 and portion 56, in turn, is bigger in thickness and cross sectional area than the end 58.

Portions 54 and 56 are provided with a flat mounting surface 60 that connects with a curved surface 62. The flat surface 60 is depressed out of the plane containing the upper surface of the body portion of the member 50, that is, the portion of member 50 between its attachment to the spokes 14 and 16. Drilled holes extend through the portions 54 and 56 for the purpose of accommodating rivets.

A pair of leaf spring members 64 and 66 have a generally semi-circular configuration in the plan view. Each of these springs is identical to spring 24. Spring 64 is supported on the surface 60. In one embodiment the springs 64 and 66 were constructed with an arcuate extent of 203°.

Each of the leaf springs 64 and 66 is provided with a pair of holes that are in alignment with the drilled holes in the member portions 54 and 56. Rivets 68 and 70 extend through these holes and secure the springs 64 and 66 to the end portion of the rigid rim core member 50. A metal band 72, similar to the band 34 of FIG. 1, encircles the end 58 of the member 50 and the two leaf springs 64 and 66.

FIG. 6 shows the construction at the right side of the rim core. The construction of the juncture between the left ends of the springs 64 and 66 and the left end of the member 50 is similar.

The embodiment of FIG. 6 provides a construction for the end portions of the rigid core member 50 that is slightly resilient so as to reduce stress concentrations when the leaf spring members 64 and 66 are deflected under an impact load. In this embodiment two full semi-circular leaf spring members 64 and 66 extend from one end to the other end of the rigid core member 50. This arrangement permits a construction having a desired degree of resiliency with respect to an impact load upon the upper portion of the rim that is parallel to the axis of rotation of the steering wheel. No partial or short leaf springs are used in this embodiment.

The curve surface 62 reduces stress concentrations in the leaf springs 64 and 66 when they are flexed under an impact load. The band 72 serves to reinforce the leaf spring members 64 and 66 when they are flexed rearwardly such as when a motor vehicle operator grasps the upper portion of the steering wheel and exerts a rearward load upon it. This may occur when the operator is first seating himself behind the steering wheel.

METHOD OF MANUFACTURE

The steering wheel of FIG. 6 is manufactured by machining the hub 12 and attaching the inner ends of the spokes 14 and 16 to it by means such as welding. The rim core member 50 is formed from bar stock having a circular configuration in cross section. The stock is bent into a semi-circular shape in plan view to the configuration of FIG. 6 after the ends are formed by cold heading.

The leaf spring members 64 and 66 are identical to each other in construction and configuration. These members are formed by continuous edge rolling flat spring wire stock so as to produce a helix having a large number of turns. The number of turns is selected on the basis of convenience in handling during the manufacturing operation. Two hundred turns may be an appropriate number. During the winding of the helix, the flat wire stock is notched at 203° intervals (or at such other intervals as corresponds to the length of the arc of the springs 64 and 66). A pair of holes are drilled through the helical band on either side of each notch. These holes will subsequently accommodate the rivets 68 and 70.

When the helix is wound to a convenient length, it is cut and then placed in a supporting fixture to maintain each turn of the helix in flush engagement with its adjacent turn. The helix is then heat treated in an oven and oil quenched. After heat treatment, the helix is broken at each of the notches whereby the arcuate leaf springs 64 and 66 are produced.

The ends of the arcuate springs 64 and 66 are placed upon the end portions of the core member 50 and secured thereto by the rivets 68 and 70. The metal band 72 is then strapped about the end 58 and the two springs 64 and 66. Finally, a plastic covering, corresponding to the covering 38 of FIG. 1, is molded about the fabricated rim core.

The manufacturing steps involved in making the steering wheel 10 of FIG. 1 is generally similar. The rim core member 18 is formed similarly to member 50. The arcuate leaf spring 24 is made in a manner identical to the making of springs 64 and 66. The short arcuate springs 26 and 30 may be made by stamping or by cutting segments from a helix of flat spring wire. The assembly of the steering wheel 10 includes riveting the springs 24, 26 and 30 to the ends 20 and 22 of the rim core member 18. The entire rim core assembly is enclosed by molding the member 38 about it.

The steering wheel having a rim core constructed in accordance with this invention is characterized by its economy of manufacture and its superior performance in a motor vehicle.

The foregoing description presents the presently preferred embodiment of this invention. Details of construction have been presented for purposes of illustration and are not to be considered limits of the invention. Alterations and modifications of the invention may occur to those skilled in the art that will come within the scope and spirit of the following claims.

We claim:

1. A steering wheel for a motor vehicle having a rim means with a flexible rim portion;
    said steering wheel comprising a hub and a spoke having its inner end connected to said hub;
    said rim means being secured to the outer end of said spoke;
    said rim means comprising a rigid rim core member of generally arcuate shape in plan view;
    said rim means also including a flexible rim core member of generally arcuate shape in plan view secured to said rigid rim core member and combining with said rigid member to form a structure of annular shape;
    said flexible rim core member being deflectable under an impact load imposed upon the mid point of said flexible member in a direction parallel to the axis of rotation of said wheel;

said rigid rim core member being substantially rigid with respect to an impact load imposed upon the mid point of said rigid member that is equal in magnitude and parallel in direction to said first mentioned impact load.

2. A steering wheel for a motor vehicle according to claim 1 and including:
  said flexible rim core member comprising a resilient spring member.

3. A steering wheel for a motor vehicle according to claim 1 and including:
  said rigid rim core member and said flexible rim core member each having a generally semicircular shape in the plan view;
  said members being secured together in an end-to-end manner.

4. A steering wheel for a motor vehicle according to claim 1 and including:
  said flexible rim core member comprising a flat leaf spring member having one of its major surfaces in a plane perpendicular to the axis of rotation of said steering wheel;
  said flexible rim core member being substantially rigid against deflection with respect to a force imposed upon said flexible member in the plane of said flat surface.

5. A steering wheel for a motor vehicle comprising a hub;
  a pair of spokes having their inner ends secured to said hub;
  a rigid rim core of generally arcuate shape in plan view secured to the outer ends of said spokes;
  said rigid core having first and second ends;
  a spring metal rim core of arcuate shape in plan view having spaced apart ends secured to said ends of said rigid core;
  said rigid rim core and said spring metal rim core combining to form a structure of annular shape;
  said spring metal rim core being resiliently deflectable under an impact load imposed upon the mid point thereof in a direction parallel to the axis of rotation of said wheel;
  said rigid rim core being substantially rigid with respect to an impact load imposed upon the mid point thereof that is equal in magnitude and parallel in direction to said first mentioned impact load.

6. A steering wheel for a motor vehicle according to claim 5 and including:
  said spring metal core comprising a leaf spring member having a major flat surface lying in a plane perpendicular to the axis of said steering wheel.

7. A steering wheel for a motor vehicle according to claim 5 and including:
  first and second arcuate spring pieces overlaying the ends of said spring metal core;
  attachment means securing said first and second arcuate spring pieces and the ends of said spring metal core to said first and second ends of said rigid core.

8. A steering wheel for a motor vehicle according to claim 5 and including:
  said first and second ends of said rigid rim core having mounting surfaces;
  said spring metal rim core comprising a leaf spring member;
  first and second relatively short arcuate leaf spring pieces overlaying the ends of said leaf spring member;
  attachment means securing said first and second leaf spring pieces and the ends of said leaf spring member to the first and second ends of said rigid core.

9. A steering wheel for a motor vehicle according to claim 5 and including:
  said spring metal core and said rigid rim core each having a generally semi-circular shape in plan view.

10. A steering wheel for a motor vehicle comprising a hub, a rim and a spoke interconnecting said hub and said rim;
  said rim having a rigid rim portion of arcuate shape in plan view;
  said rigid rim portion having first and second ends;
  a resilient rim portion of arcuate shape in plan view having spaced apart ends secured to said ends of said rigid rim portion to form an annular structure;
  said resilient rim portion comprising a plurality of arcuate leaf springs arranged in flush engagement with each other;
  said resilient rim portions being resiliently deflectable under an impact load imposed upon the mid point thereof in a direction parallel to the axis of rotation of said wheel;
  said rigid rim portion being substantially rigid with respect to an impact load imposed upon the mid point thereof that is equal in magnitude and parallel in direction to said first mentioned impact load.

11. A steering wheel for a motor vehicle according to claim 10 and including:
  each of said plurality of arcuate leaf springs having substantially the same length.

12. A steering wheel for a motor vehicle comprising a hub, a rim and a spoke interconnecting said hub and said rim;
  said rim comprising a rigid rim core of generally arcuate shape in plan view having first and second end portions;
  said end portions having a lesser cross sectional area than the portion of said rigid rim core between said end portions;
  a spring metal rim core of arcuate shape in plan view having spaced apart ends secured to said end portions of said rigid core;
  said rigid rim core and said spring metal rim core combining to define an annular structure;
  said flexible rim core being resiliently deflectable under an impact load imposed upon said flexible member in a direction parallel to the axis of rotation of said wheel;
  said rigid rim core being substantially rigid with respect to an impact load imposed upon said rigid core that is equal in magnitude and parallel in direction to said first mentioned impact load.

13. A steering wheel for a motor vehicle according to claim 12 and including:
  each of said end portions having cross sectional areas that are progressively smaller toward the terminus thereof.

14. A steering wheel for a motor vehicle according to claim 12 and including:
  each of said end portions having a generally stepped configuration in side elevational view with progressively smaller cross sectional areas toward the terminus thereof.

15. A steering wheel for a motor vehicle according to claim 12 and including:
  said first end portion of said rigid rim core having a flat mounting surface;

said spring metal rim core comprising a leaf spring member in flush engagement with said mounting surface;
said first end portion having a curved surface that forms an extension of said mounting surface and is spaced apart from said leaf spring member;
attachment means securing said leaf spring member to said first end portion of said rigid core.

* * * * *